(12) United States Patent  
Yamamoto

(10) Patent No.: US 7,145,698 B2  
(45) Date of Patent: Dec. 5, 2006

(54) INFORMATION READING APPARATUS

(75) Inventor: Yuichi Yamamoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 10/151,152

(22) Filed: May 21, 2002

(65) Prior Publication Data

US 2002/0176115 A1    Nov. 28, 2002

(30) Foreign Application Priority Data

May 22, 2001    (JP)    ............................. 2001-153069

(51) Int. Cl.  
*H04N 1/04*    (2006.01)  
*G03G 15/00*    (2006.01)

(52) U.S. Cl. ...................... 358/408; 358/496; 358/497; 358/498; 399/367

(58) Field of Classification Search ................ 358/408, 358/496, 497, 498, 474; 399/367, 374  
See application file for complete search history.

(56) References Cited

U.S. PATENT DOCUMENTS

| 4,792,828 A | 12/1988 | Ozawa et al. ............. 355/14 R |
| 4,829,341 A | 5/1989 | Sasaki et al. .................. 355/75 |
| 4,908,662 A | 3/1990 | Yamamoto et al. ......... 355/218 |
| 5,298,937 A * | 3/1994 | Telle ............................ 355/23 |
| 6,721,074 B1 * | 4/2004 | Kao ............................ 358/496 |
| 6,901,237 B1 * | 5/2005 | Nakamura ................... 399/367 |

FOREIGN PATENT DOCUMENTS

| JP | 6-105031 | 4/1994 |
| JP | 10-28209 | 1/1998 |
| JP | 2001-42578 | 2/2001 |

* cited by examiner

*Primary Examiner*—Jerome Grant  
*Assistant Examiner*—Houshang Safaipour  
(74) *Attorney, Agent, or Firm*—Fitzpatrick, Cella, Harper & Scinto

(57)    ABSTRACT

An information reading apparatus reads information on a recording sheet. The apparatus includes a first information reading unit that reads information recorded on one side of an information sheet. A second information reading unit reads information recorded on the other side of the information sheet. An information sheet conveying unit conveys the information sheet to the second information reading unit via the first information reading unit. A control unit controls one of the first information reading unit and the second information reading unit to re-read the information sheet when the other information reading unit is unable to read the information.

2 Claims, 16 Drawing Sheets

FIG.12
(a)
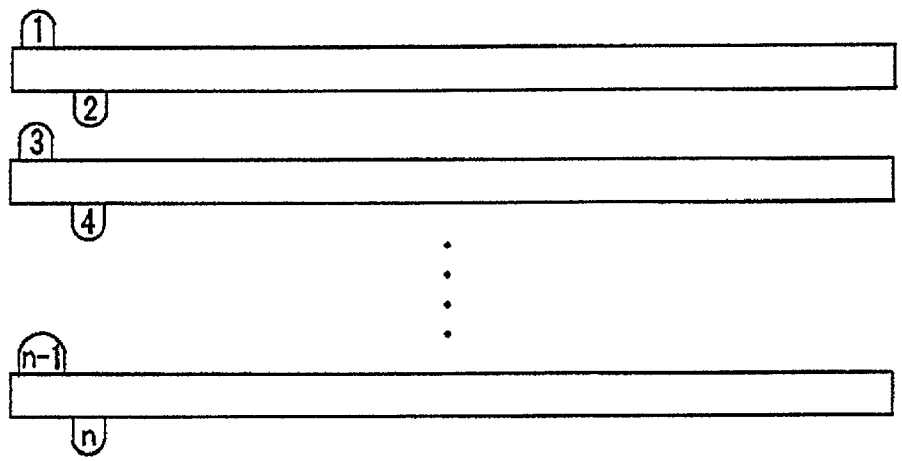
(b)
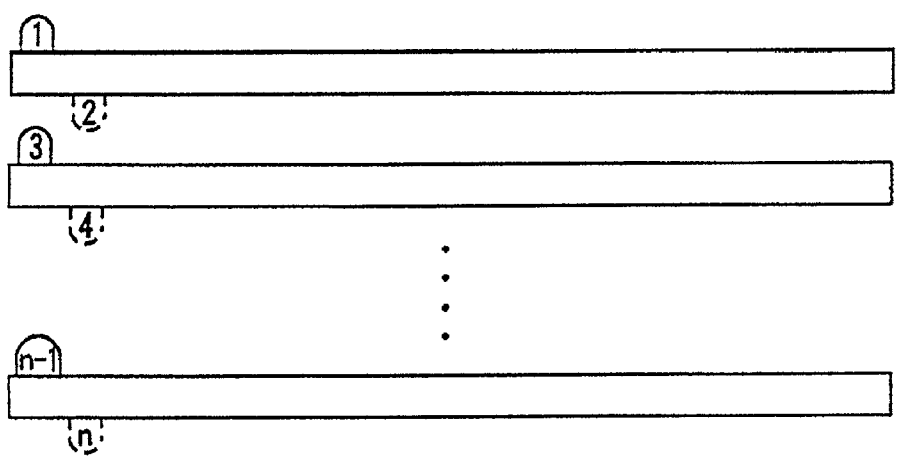
(c)
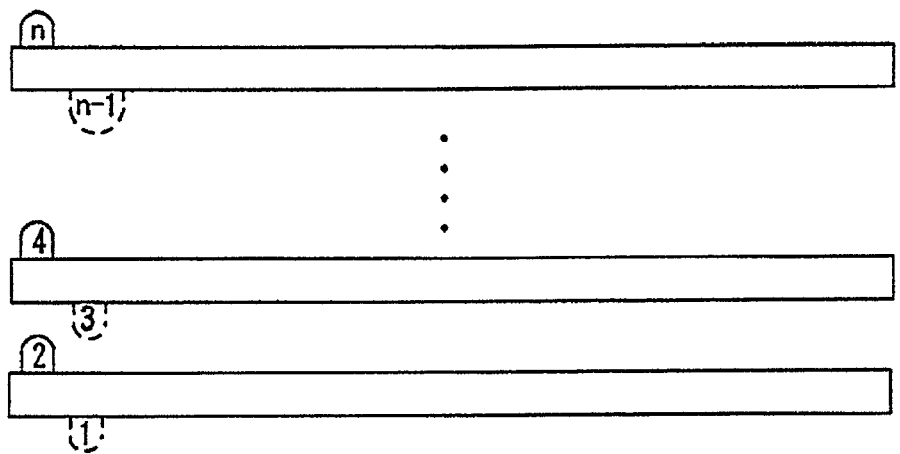

INFORMATION READING APPARATUS

BACKGROUND OF THE INVENTION

1. Field of the Invention

This invention relates to an information reading apparatus for reading information recorded to an information sheet and an image forming apparatus having the information reading apparatus attached to a main body thereof for forming information read by the information reading apparatus onto a sheet.

2. Description of Related Art

A conventional information reading apparatus is attached to a main body of an image forming apparatus, such as a copier, a printer, a facsimile machine, or a multi-function machine including these image forming apparatuses, in which the information reading apparatus conveys an information sheet, e.g., an original document, to an information reading portion thereof and reads letters, pictures or the like (hereinafter referred to as "images") formed on the original document.

The so-called stationary reading method, which reads an image by moving an information reading portion upon an original document stationarily positioned on a platen, and the so-called feed reading method, which reads an image by positioning an information reading portion and moving an original document on a platen, are reading methods (scanning methods) for reading an image on an original document.

Information reading apparatuses in recent years employ the feed reading method for improving productivity (increasing the readable amount of original documents per time) and for reducing apparatus size; furthermore, the information reading apparatuses also employ a method of reading a front side and back side of an original document in a single conveyance by having two information reading portions therein for improving productivity.

In a conventional information reading apparatus 180 shown in FIG. 13 to FIG. 16, a reading targeted original document placed on an original document feeding tray 111, starting from an uppermost placed original document, is conveyed in-between a separation conveying roller 103 and a separation pad 104 by an original document feeding roller 101. When plural overlapped original documents are conveyed, the separation conveying roller 103 and the separation pad 104 separate the original documents to a single original document and convey the separated single original document.

The separated single original document is skew corrected by a resist roller pair 121 arranged downstream, is then passed through a roller pair 122, 124 and a roller pair 123, 124 as shown in FIG. 14, and is then guided to a first contact sensor 127. The first contact sensor 127 reads image information recorded on one side (front side, upper side when placed on the original document feeding tray 11) of an original document D.

The original document D is then passed through a roller pair 125, 124 as shown in FIG. 15, and is guided to a second contact sensor 128. The second contact sensor 128 reads image information recorded on the other side of the original document D (back side, bottom side when placed on the original document feeding tray 111). Finally, the original document, as shown in FIG. 16, is directly guided to an original document delivery roller pair 116, and is delivered upon an original document delivery tray 119.

When an image is formed only on one side of an original document mounted on the original document feeding tray (when a single-side mode is selected), the information reading apparatus 180 shown in FIG. 13 allows image information to be read by the first contact sensor 127 while having the second contact sensor 128 in a non-active state. Accordingly, the original document has image information thereof read by the first contact sensor 127 and is then directly delivered to the original document delivery tray 119 by the original document delivery roller pair 116.

Since the conventional information reading apparatus only has one original document conveying path, an original document having image information formed on both sides thereof cannot be read when one of the contact sensors is disabled. Even reading of an original document having image information formed on one side becomes impossible when, for example, the first contact sensor 127 is disabled.

Furthermore, the contact sensor opens and closes with respect to the platen and creates a shock or the like whenever an original document is placed on the platen, and thereby causes damage to one of the contact sensors (makes reading impossible) and prevents image information from being read precisely. Image information is also prevented from being read precisely even when the image information is formed on a single side of the original document.

It is an object of this invention to provide an information reading apparatus capable of reading image information formed on both sides of an original document even when one of the contact sensors thereof is unable to perform reading, and an image forming apparatus having the information reading apparatus attached thereto for forming a high quality image upon a sheet.

SUMMARY OF THE INVENTION

In means to solve the foregoing problems, an information reading apparatus of this invention has: an information sheet stacking means for stacking an information sheet having information recorded on both sides thereof; a first information reading means for reading information recorded to one side of the information sheet fed from the information sheet stacking means; a second information reading means for reading information recorded to the other side of the information sheet; an information sheet conveying means for conveying the information sheet from the information sheet stacking means to the second information reading means via the first information reading means; and an information sheet backward conveyance means for conveying the information sheet from the second information reading means to the information sheet conveying means between the information sheet stacking means and the first information reading means.

An information reading apparatus of this invention has: an information sheet stacking means for stacking an information sheet having information recorded on both sides thereof; a first information reading means for reading information recorded to one side of the information sheet fed from the information sheet stacking means; a second information reading means for reading information recorded to the other side of the information sheet; an information sheet conveying means for conveying the information sheet from the information sheet stacking means to the second information reading means via the first information reading means; a first reading mode for reading one side of the information sheet with one of the first information reading means and the second information reading means and a second reading mode for reading the other side of the information sheet with one of the first information reading means and the second information reading means when the other one of the information reading means is unable to read information; and a memory means being able to memorize information read from the first reading mode and the second reading mode in a sequential page order of the information sheet.

An information reading apparatus of this invention has: an information sheet stacking means for stacking an information sheet having information recorded thereto; a first information reading means for reading information recorded to one side of the information sheet fed from the information sheet stacking means; a second information reading means for reading information recorded to the other side of the information sheet; an information sheet conveying means for conveying the information sheet from the information sheet stacking means to the second information reading means via the first information reading means; and an indicating means for indicating a stack state of the information sheet on the information sheet stacking means subsequent to reading one side of the information sheet with one of the first information reading means and the second information reading means when the other information reading means is unable to read.

An information reading apparatus of this invention has: an information sheet stacking means for stacking an information sheet having information recorded thereto; a first information reading means arranged upstream relative to a conveyance direction for reading information recorded to one side of the information sheet fed from the information sheet stacking means; a second information reading means arranged downstream relative to a conveyance direction for reading information recorded to the other side of the information sheet; an information sheet conveying means for conveying the information sheet from the information sheet stacking means to the second information reading means via the first information reading means; a backward conveyance means arranged downstream of the second information reading means for reversing a conveyance direction and the front-back sides of an information sheet and then conveying an information sheet to the first information reading means, wherein the second information reading means reads information recorded to one side of the information sheet and then reads information recorded to the other side of the information sheet after the information sheet is reversed by the backward conveyance means when the first information reading means is unable to read, and wherein the first information reading means reads information recorded to one side of the information sheet and then reads information recorded to the other side of the information sheet after the information sheet is reversed by the backward conveyance means when the second information reading means is unable to read.

In means to solve the foregoing problems, an image forming apparatus of this invention has any one of the information reading apparatuses described above; and an image forming means for forming information read by the information reading apparatus onto a sheet. In addition, the reading means above is not limited to a contact sensor described in embodiments below and various kinds of sensors could be adopted as the reading means. Furthermore, regarding the sheet conveying means and the reversal path, they are not limited to the embodiments below, but they could be changed to other devices or configurations, too.

BRIEF DESCRIPTION OF THE DRAWINGS

The above and other objects and features of the invention will be apparent to those skilled in the art from the following preferred embodiments thereof when considered in conjunction with the accompanied drawings, in which:

FIG. 12 is an explanatory view of an original document conveyance state according to the automatic original document feeding apparatus, in which FIG. 12(a) is a view showing a stacked state of original documents stacked on an original document feeding tray serving as an information sheet stacking means, FIG. 12(b) is a view showing a state when information formed on one side of an original document is read, and FIG. 12(c) is a view showing a stacked state of original documents stacked on an original document feeding tray when reading information formed on the other side of an original document;

DESCRIPTION OF THE PREFERRED EMBODIMENTS

An embodiment of this invention related to an information reading apparatus being attached to a main body of an image forming apparatus will hereinafter be described with reference to the drawings.

It is now to be noted that the information reading apparatus of this embodiment, though attached to a main body of a copier serving as an image forming apparatus, can also be attached to a main body of other image forming apparatuses and is not be restricted as being attached only to a main body of a copier.

(Copier)

Figure 1:
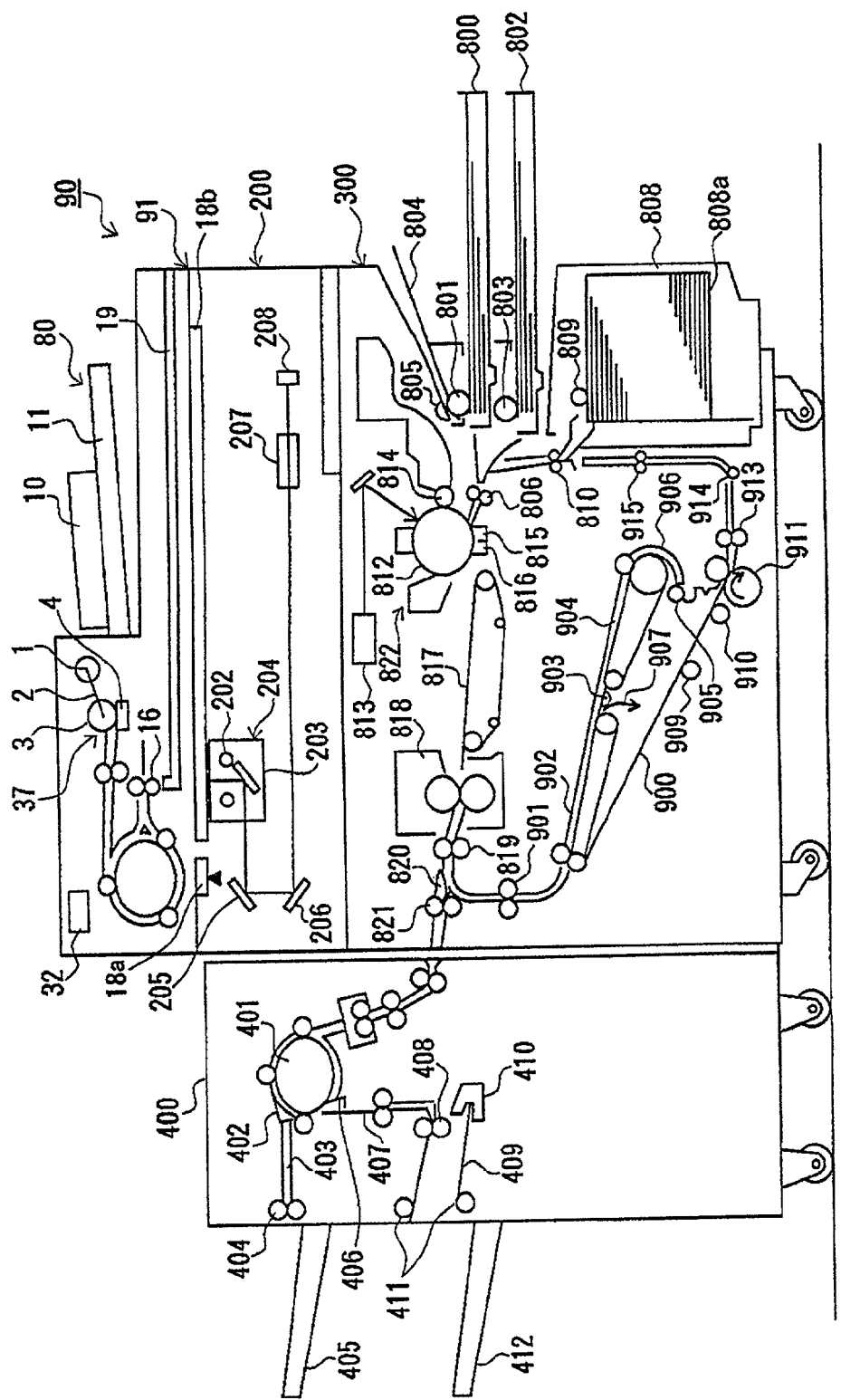
FIG. 1 is a schematic front cross-sectional view of a copier serving as an image forming apparatus with an automatic original document feeding apparatus formed therein according to an embodiment of this invention regarding an information reading apparatus.

A copier 90, as shown in FIG. 1, has an automatic original document feeding device (hereinafter referred as "ADF") 80, an image inputting section (hereinafter referred as "reader section") 200, an image outputting section (hereinafter referred as "printer section") 300, and a sheet processing device 400. It is now to be noted that the sheet processing device 400 is not necessarily required. Comprising an information reading apparatus are the ADF 80 and the image inputting section 200.

The ADF 80 has an original document feeding tray 11 serving to mount an original document (information sheet) thereon. The original document on the original document feeding tray 11, starting from an uppermost placed original document, is orderly conveyed by an original document feeding roller 1, is then separated sheet by sheet by a separation section 37 comprised of a separation conveying roller 3 and a separation pad 4, and is then conveyed upon a platen 18 serving as an image reading area in a main body 91 of the copier 90. After an image is read, the original document is delivered onto an original document delivery tray 19 by an original document delivery roller pair 16.

The main body 91 of the copier 90 is comprised of the reader section 200 and the printer section 300.

The reader section 200 (described in detail afterwards) serves to input image data by optically reading and photo-electrically converting the image information recorded on a reading target such as an original document. The reader section 200 includes, for example, platens 18a and 18b, a lamp 202, a scanner unit 204, mirrors 205 and 206, a lens 207, and an image sensor 208. The scanner unit 204 includes, for example, a mirror 203.

The printer portion 300 will next be described.

A targeted recording sheet (hereinafter referred as "sheet"), such as a targeted recording medium, contained in an upper cassette 800 is separated by a separation claw (not shown) and conveyed sheet by sheet to a resist roller pair 806 by a feeding roller 801. A sheet contained in a lower cassette 802 is also separated by a separation claw (not shown) and conveyed sheet by sheet to a resist roller pair 806 by a feeding roller 803. A sheet inserted into a manual feeding guide 804 is also conveyed sheet by sheet to a resist roller pair 806 by a roller 805. A deck type sheet mounting device 808 has an intermediary panel 808a being allowed to move up and down by a motor or the like. A sheet placed on the intermediary panel 808a is separated by a separation claw and conveyed sheet by sheet to a conveying roller pair 810 by a feeding roller 809.

A read optical system 813 forms a latent image on a photosensitive drum 812 based on image information from the reader section 200 or image information from an external section. A developing device forms a toner image on the photosensitive drum 812 based on the latent image on the photosensitive drum 812. A transfer charging device 815 charges a sheet and transfers the toner image on the photosensitive drum 812 to the sheet. A separating charging device 816 separates the sheet from the photosensitive drum 812. An image forming section 822 is comprised of, for example, the photosensitive drum 812, the read optical system 813, the developing device 814 and the transfer charging device 815.

A conveying belt 817 conveys the sheet having a toner image transferred thereto. A fixing device 818 fixes the toner image to the sheet. A conveying roller 819 conveys the sheet having the toner image fixed thereto. A flap 820 selectively guides the sheet to the sheet processing device 400 and an intermediary tray 900.

An intermediary tray 900 once stacks a sheet having an image formed thereon when forming an image on both sides of the sheet or when forming an overlapped image (multiple layer) to one side of the sheet. A conveying roller 901, a conveying belt 902, a flap 903, a conveying belt 904, and a conveying roller 905 are arranged above the intermediary tray 900.

With the ADF 80, the reader section 200, and the printer section 300, a toner image is formed on the photosensitive drum based on image information of a single original document (an information sheet serving as an original document or the like targeted for reading) read over the platen, and a sheet (a targeted recording sheet such as a targeted recording medium) is fed between the photosensitive drum 812 and the transfer charging device 815 from either one of the upper cassette 800, the lower cassette 802, or the sheet mounting device 808. The resist roller pair 806 serves to adjust the position between the toner image on the photosensitive drum 812 and the sheet. An image is formed to the photosensitive drum 812 and the sheet is delivered each time to the photosensitive drum in correspondence to the number of the sheet(s) being set for copying.

Accordingly, based on the single original document read over the platen, the image is first copied to one side of a sheet in an amount corresponding to the number of the sheet(s) being set for copying. When copying an image only to one side of the sheet, the sheet having an image formed thereon is guided to a main body delivery roller 821 by the flap 820 and is then delivered to the sheet processing device being positioned downstream.

When copying an image on both sides of the sheet, the sheet is passed through a path 906 and is then mounted on the intermediary tray 900 in a manner where one side having the image formed thereon is faced upward. When performing multiple layer copying where plural images are copied to one side of the sheet in an overlapped manner, the sheet is passed through a path indicated by numeral 907 and is then mounted on the intermediary tray 900 in a manner where one side having the image formed thereon is faced downward.

Subsequently, the targeted reading original document has a front side and a back side thereof reversed at the ADF 80 and is once again guided to the reading section (platen 18), so that image information can be read. The read information (image information) is formed on a targeted recording sheet being fed once again from the intermediary tray 900. The sheet mounted on the intermediary tray 900 is conveyed by supporting rollers 909, 910 and a reverse separating roller pair 911, so that the sheet can be separately delivered sheet by sheet from below at the intermediary tray 900. The sheet is guided to the image forming section via the conveying rollers 913, 914, 915, 810 and the resist roller pair 806 and once again has an image formed thereon. The sheet having an image formed thereon is delivered by the main body delivery roller 821 to the sheet processing device 400 (also called a finisher).

When the sheet processing device 400 is in a non-sorting mode, a delivery roller 404 delivers the sheet conveyed from the main body 91 of the copier 90 upon a sample tray 405 via a buffer roller 401, a flap 402 and a non-sorting mode path 403.

When the sheet processing device 400 is in a sorting mode, a delivery roller 408 delivers the sheet conveyed from the main body of the copier upon a processing tray 409 serving as an intermediary tray via the buffer roller 401, a flap 406, and a sorting mode path 407, and thereby the sheet is temporarily mounted on the processing tray 409. Subsequently, a bundle of sheets mounted on the processing tray 409 have both end portions thereof (in the direction intersecting with the sheet conveying direction) matched by a matching member (not shown) and also have a rear end portion thereof bound by a stapler 410 whenever necessary. The bundle of sheets, regardless of being bound or not being bound, is delivered to a stacking tray 412 by a bundle delivery roller pair 411 and is stacked on the stacking tray 412.

(First Embodiment of an Information Reading Apparatus)

The ADF 80 and the image inputting section 200 of the information reading apparatus for the first embodiment of this invention will hereinafter be described with reference to FIG. 2 to FIG. 10.

Figure 2:
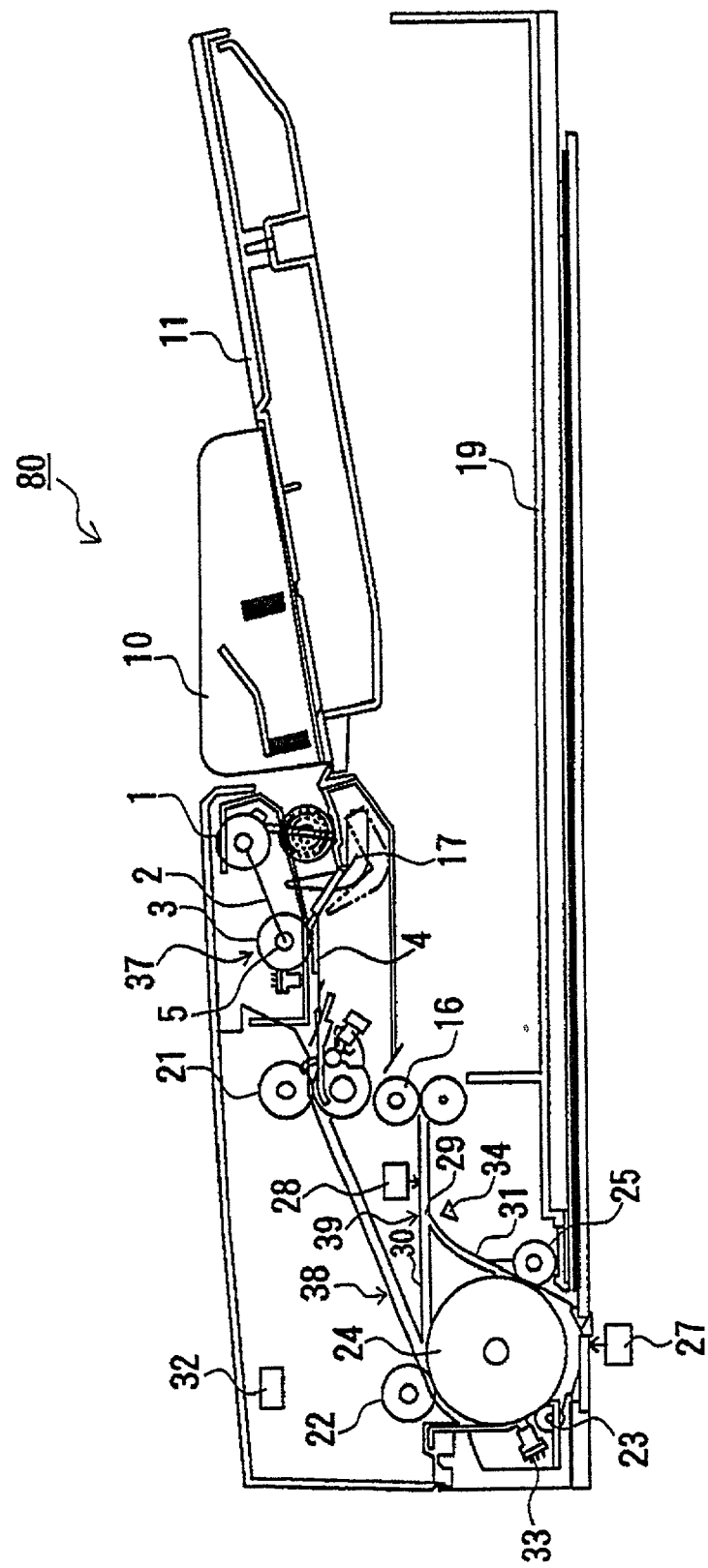
FIG. 2 is a schematic front cross-sectional view of an automatic original document feeding apparatus according to an embodiment of this invention regarding an information reading apparatus.
Figure 3:
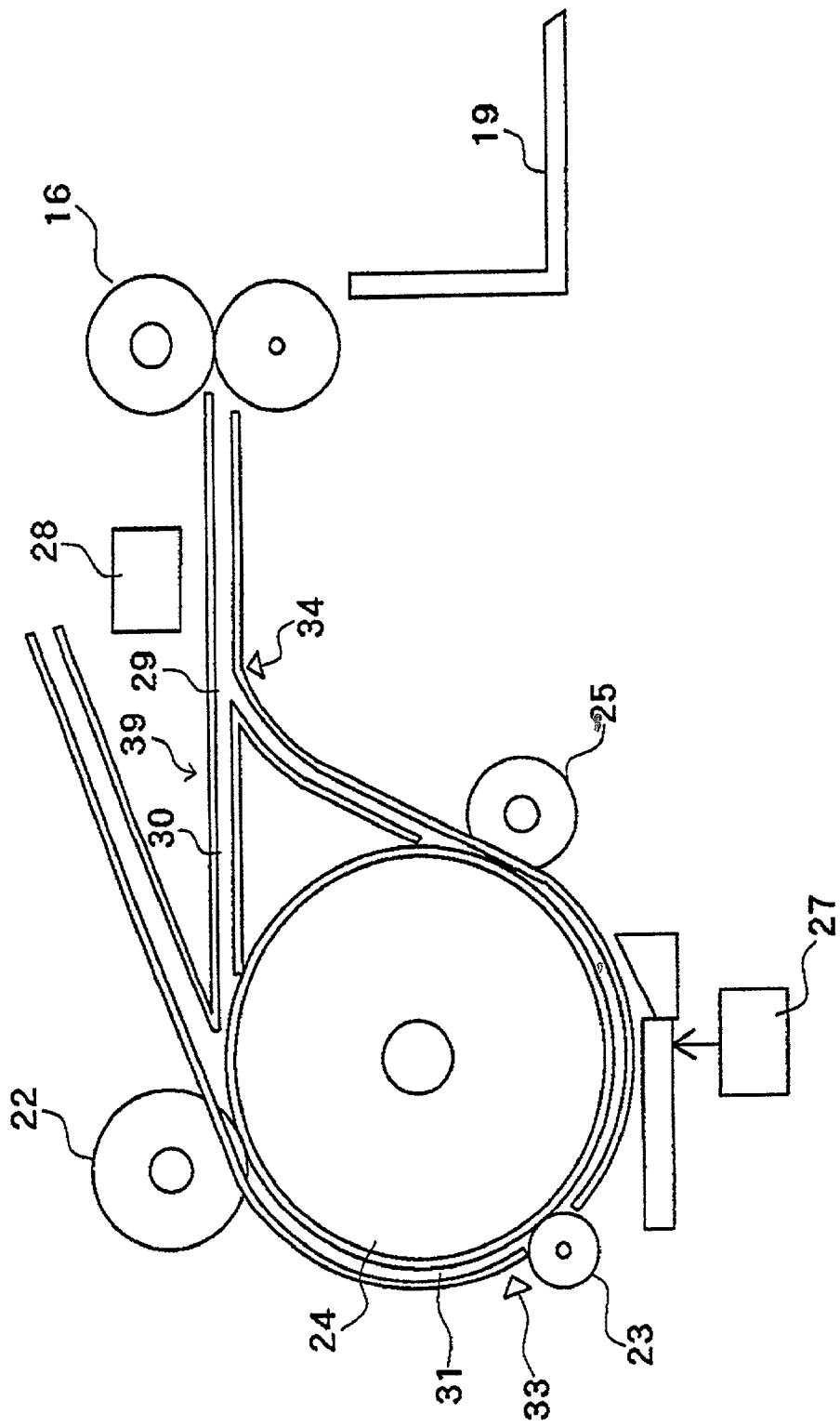
FIG. 3 is a schematic front cross-sectional view of an essential portion of the automatic original document feeding apparatus in FIG. 2.
Figure 9:
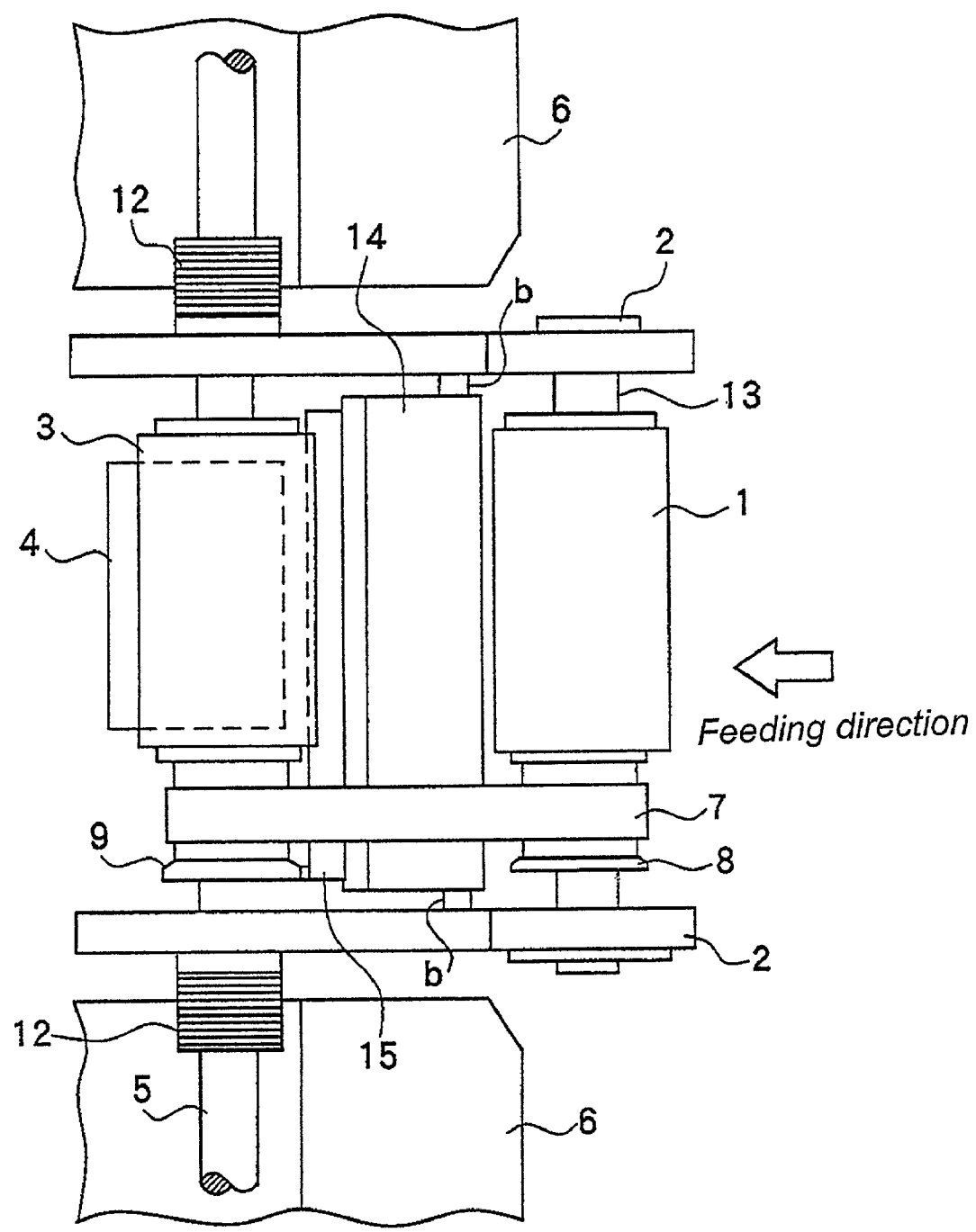
FIG. 9 is a plan view.
Figure 10:
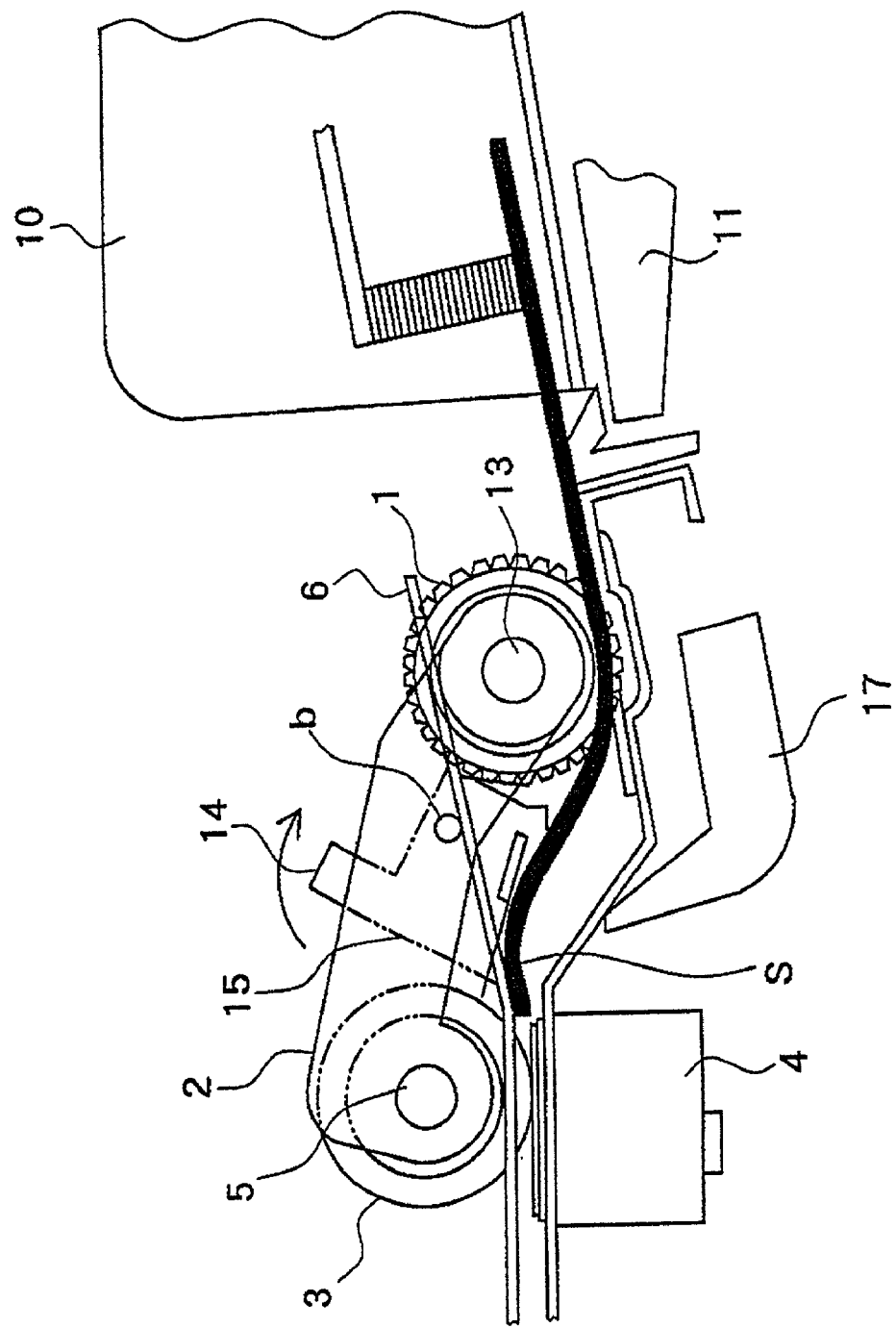
FIG. 10 is an enlarged view showing a portion for feeding an original document when performing a feeding operation of an original document according to the automatic original document feeding apparatus in FIG. 2.

An arm 2 rotates with a shaft 5 serving as a center thereof in FIG. 2 and FIG. 9. The arm 2 serves to elevate and lower the original document feeding roller 1 disposed on a rotary end portion thereof. The separation conveying roller 3 and the separation pad 4 serve to separate the original documents sheet by sheet. A fixed guide 6 smoothly guides an original document from the original document feeding roller 1 to the separation conveying roller 3 and the separation pad 4.

A timing belt serves to transmit the rotary force of a motor M to the original document feeding roller 1 via the pulleys 8 and 9. An original document feeding tray 11 serves as an original document mounting table for placement of a targeted reading sheet such as an original document. A sheet width restricting panel 10 serves to align the width of a bundle of original documents placed on the original document feeding tray 11.

Figure 8:
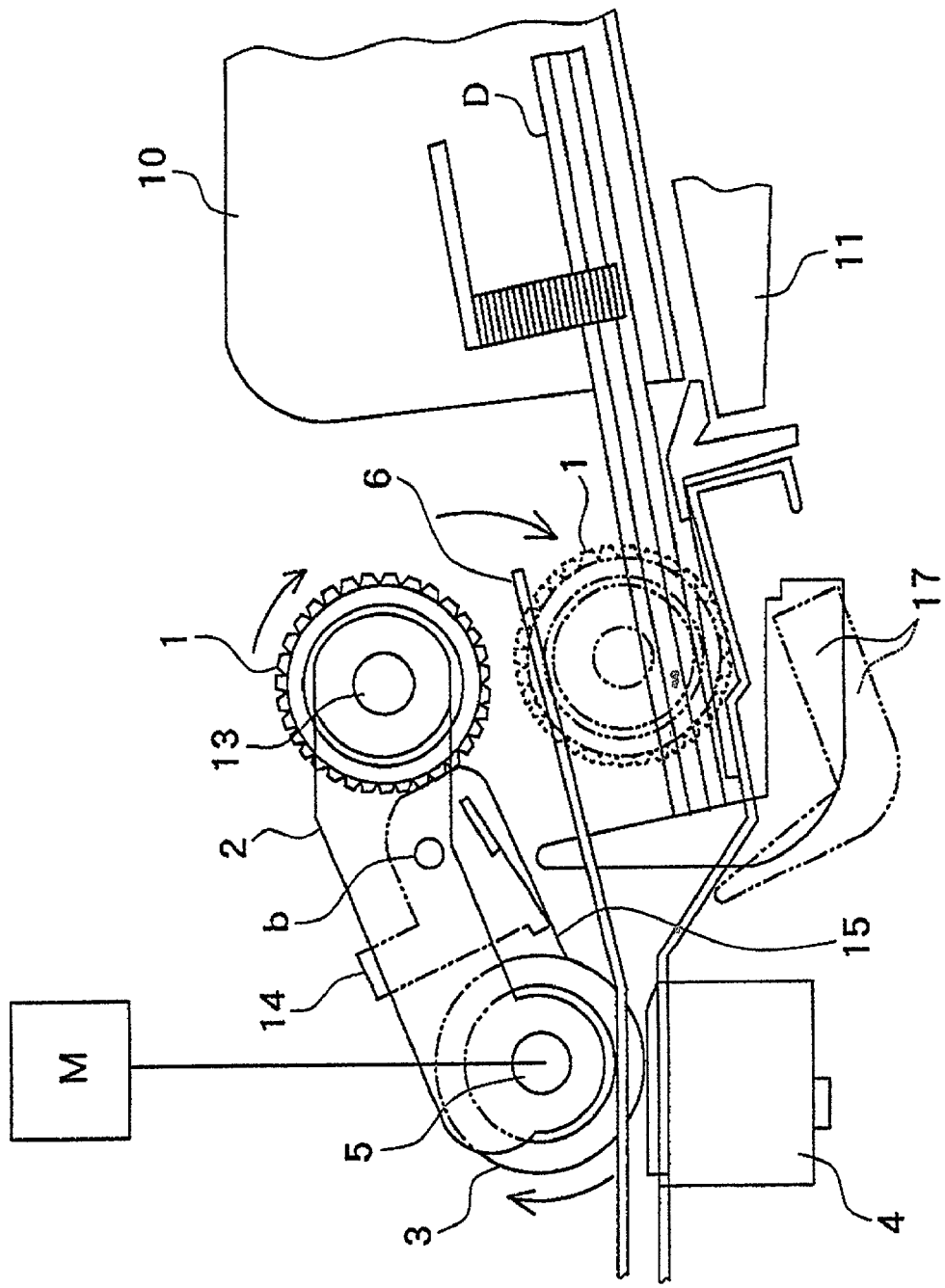
FIG. 8 is an enlarged view showing a portion for feeding an original document according to the automatic original document feeding apparatus in FIG. 2.

When the motor M is in normal rotation (when the original document feeding roller 1 and the separation conveying roller 3 rotate in an arrow direction shown in FIG. 8 while the arm 2 is lowered), a spring clutch 12 allows the original document feeding roller 1 to pressingly contact upon an upper side of an original document on the original document feeding tray 11 by allowing the original document feeding roller 1 to apply a prescribed pressing force (torque) to an upper side of the original document on the original document feeding tray 11. When the motor M is in reverse rotation (when reversely rotating with respect to the arrow direction), the spring clutch 12 is locked and allows the arm 2 to be raised. A shaft 13 serves as a center rotary axis with respect to the original document feeding roller 1. A rocking guide 14 is a guide serving to conduct a sheet from the original document feeding roller 1 to the separation conveying roller 3, and is disposed in a rockable manner on a fulcrum b at a pair of the arms 2. An elastic member 15 such as an elastically deformable Mylar is attached to a tip portion (downstream side) of the rocking guide 14. A sheet stopper 17 serves to receive the bundle of original documents.

A resist roller pair 21 performs skew correction (registration arrangement) of the original document separated sheet by sheet by the separation conveying roller 3 and the separation pad. A large diameter roller 24 serves to drive the rollers 22, 23, and 25 surrounding a reading portion. The large diameter roller 24 is formed with a large diameter for eliminating a speed difference between the roller 23 and the roller 25 when reading image information on the original document.

A first contact sensor (a first information reading means) 27 arranged inside the ADF 80 reads image information formed on one side of the original document. A second contact sensor (a second information reading means) 28 reads image information formed on the other side of the original document. A first original document detecting sensor 33 and a second original document detecting sensor 34 serving to detect the passing of the original document are arranged upstream of the first contact sensor 27 and the second contact sensor 28.

An original document delivery roller pair 16 delivers an already read original document to an original document delivery tray 119. When one of the contact sensors 27, 28 is disabled, the original document delivery roller pair 16 performs switchback conveyance into the direction of a resist roller pair comprised of the roller 22 and the large diameter roller 24 for reversing the front side and the back side of the sheet.

In a conveying path 31 starting from the resist roller pair 21, passing through the periphery of the large diameter roller 24, and terminating at the original document delivery roller pair 16, a branch point 29 is arranged between the large diameter roller 24 and the original document delivery roller pair 16 and also a reversal path 30 starting from the branch point 29 and terminating proximal to the resist roller pair comprised of the roller 22 and the large diameter roller 24 is formed for enabling the switchback conveyance of the original document. The reversal path 30 and a portion of the conveying path 31, which serve to connect the original document delivery roller pair 16 and the resist roller pair comprised of the roller 22 and the large diameter roller 24, are formed in a straight line. The switchback conveyance of the original document can be performed reliably and easily by forming a straight line path. The second original document detecting sensor 34 for detecting the original document is arranged at the branch point 29. An original document backward conveyance section (information sheet backward conveyance means) 39 includes, for example, the original document delivery roller pair 16 and the reversal path 30.

It is now to be noted that an original document conveying section (information sheet conveying means) 38 includes, for example, the resist roller pair 21, the rollers 22, 23, 24, 25, the original document delivery roller pair 16, and the conveying path 31.

The control for each roller of the automatic original document reading device 80 is performed by a control section 32 shown in FIG. 1.

(When a Contact Sensor is Disabled)

A feature of this invention will next be described with reference to FIG. 2 to FIG. 7 showing the flow of the original document when one of the contact sensors 27, 28 is disabled.

(When the Second Contact Sensor 28 is Disabled)

An original document mounted on the original document feeding tray 11, starting from an uppermost placed original document, is conveyed in-between a separation conveying roller 3 and a separation pad 4 by an original document feeding roller 1. When plural overlapped original documents are conveyed, the separation conveying roller 3 and the separation pad 4 separate the original documents to a single original document and convey the separated single original document.

Figure 4:
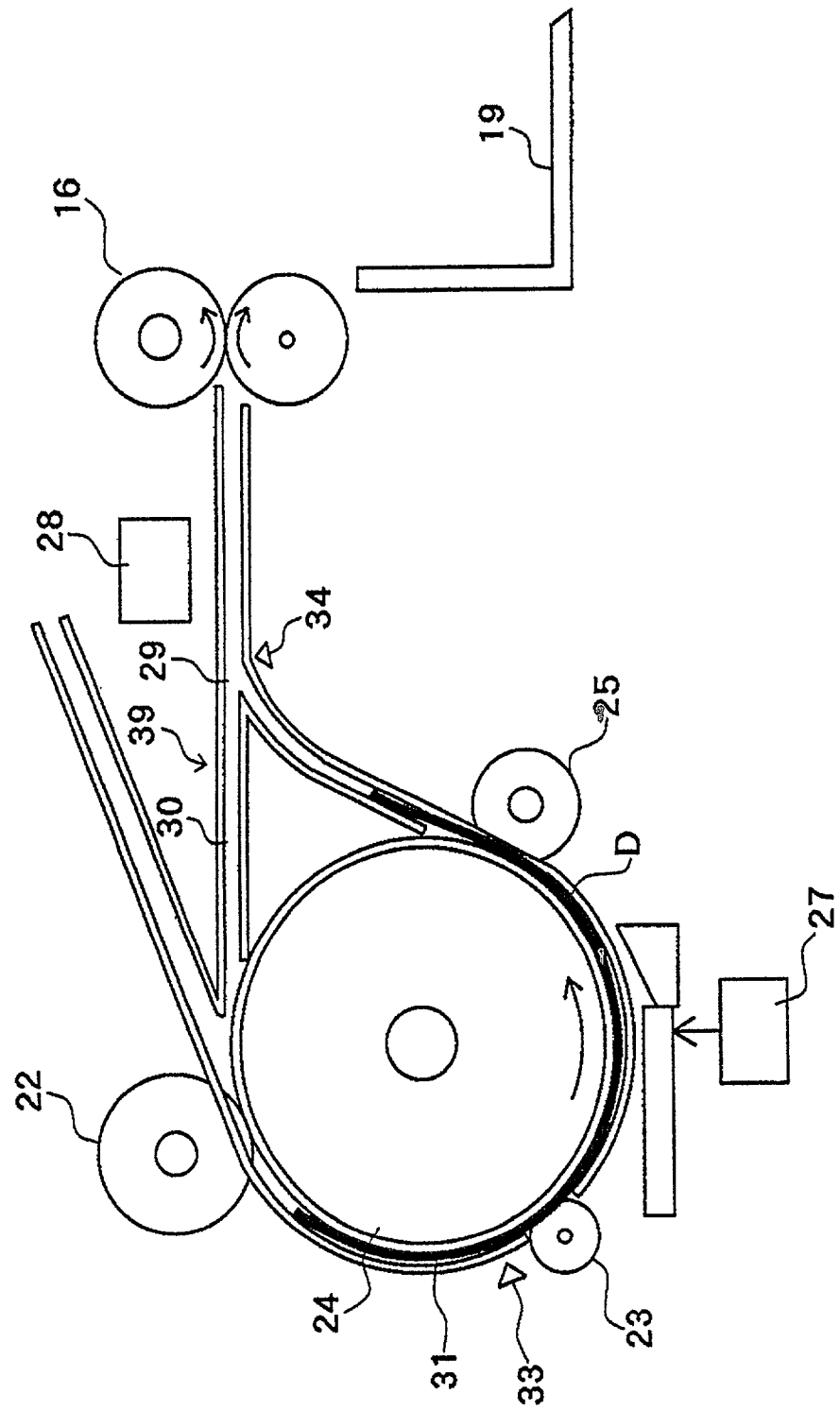
FIG. 4 is a view showing a state when a first contact sensor serving as a first information reading means is reading an original document according to the automatic original document feeding apparatus in FIG. 2.

The separated single original document is skew corrected by a resist roller pair 21 arranged downstream, is then passed through a roller pair 22, 24 and a roller pair 23, 24 as shown in FIG. 4, and is then guided to a first contact sensor 27. The first contact sensor 27 reads image information recorded on one side (front side, upper side when placed on the original document feeding tray 11) of an original document (information sheet) D.

Figure 5:
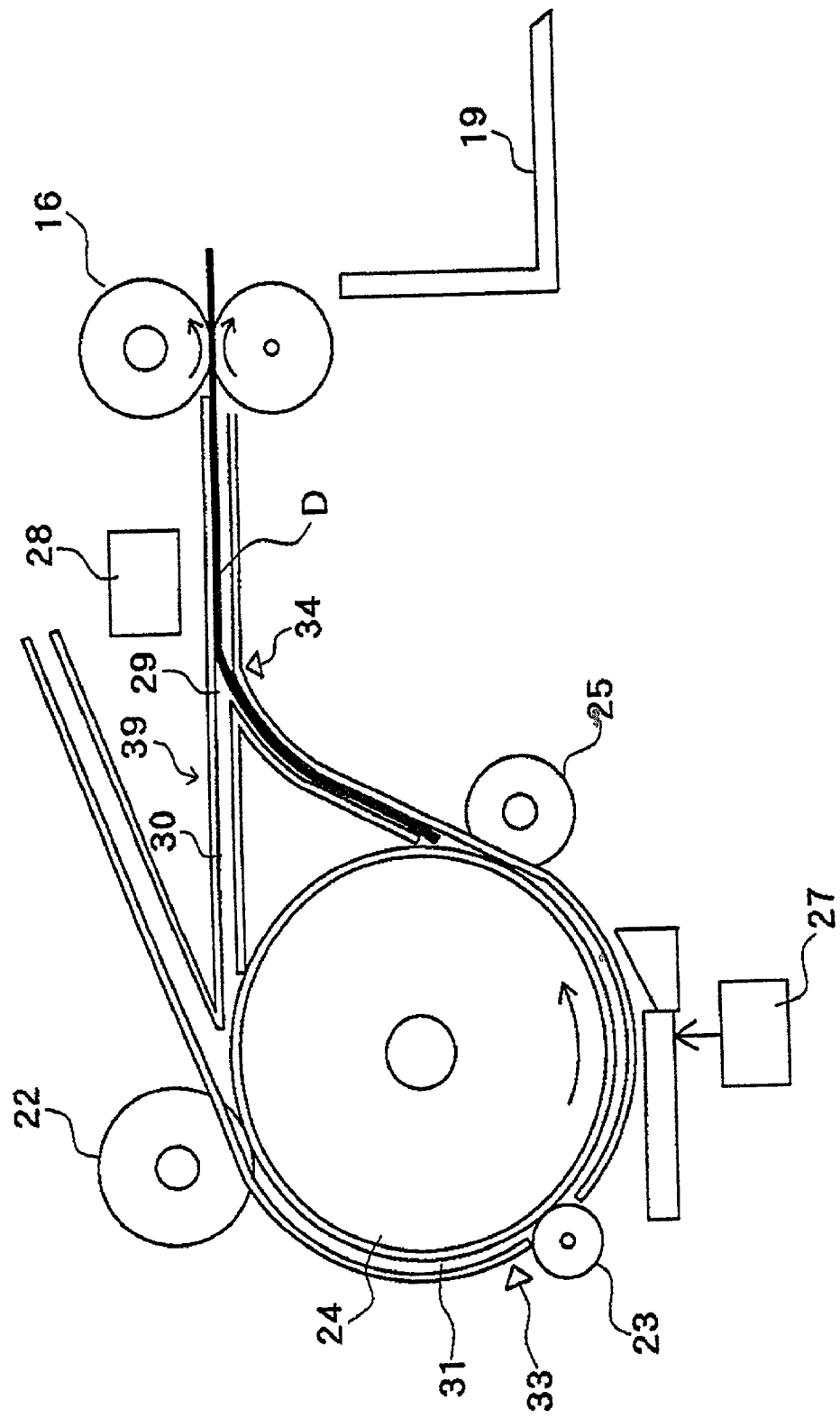
FIG. 5 is a view showing a state when an original document is conveyed to a second contact sensor serving as a second information reading means in a situation where the second contact sensor is unable to read according to the automatic original document feeding apparatus in FIG. 2.

The original document D is then passed through a roller pair 25, 24 as shown in FIG. 5, and is guided to an original document delivery roller pair 16. In this situation, when the second contact sensor 28 does not read the image on the original document even though the second original document detecting sensor 34 has detected the original document, the control section 32 determines that the second contact sensor 28 is in a disabled state and then, after the rear end of the original document is detected by the second original document detecting sensor 34, the original document delivery roller pair 16 is reversed, so that the original document guided to the original document delivery roller pair 16 is reversely conveyed.

Figure 6:
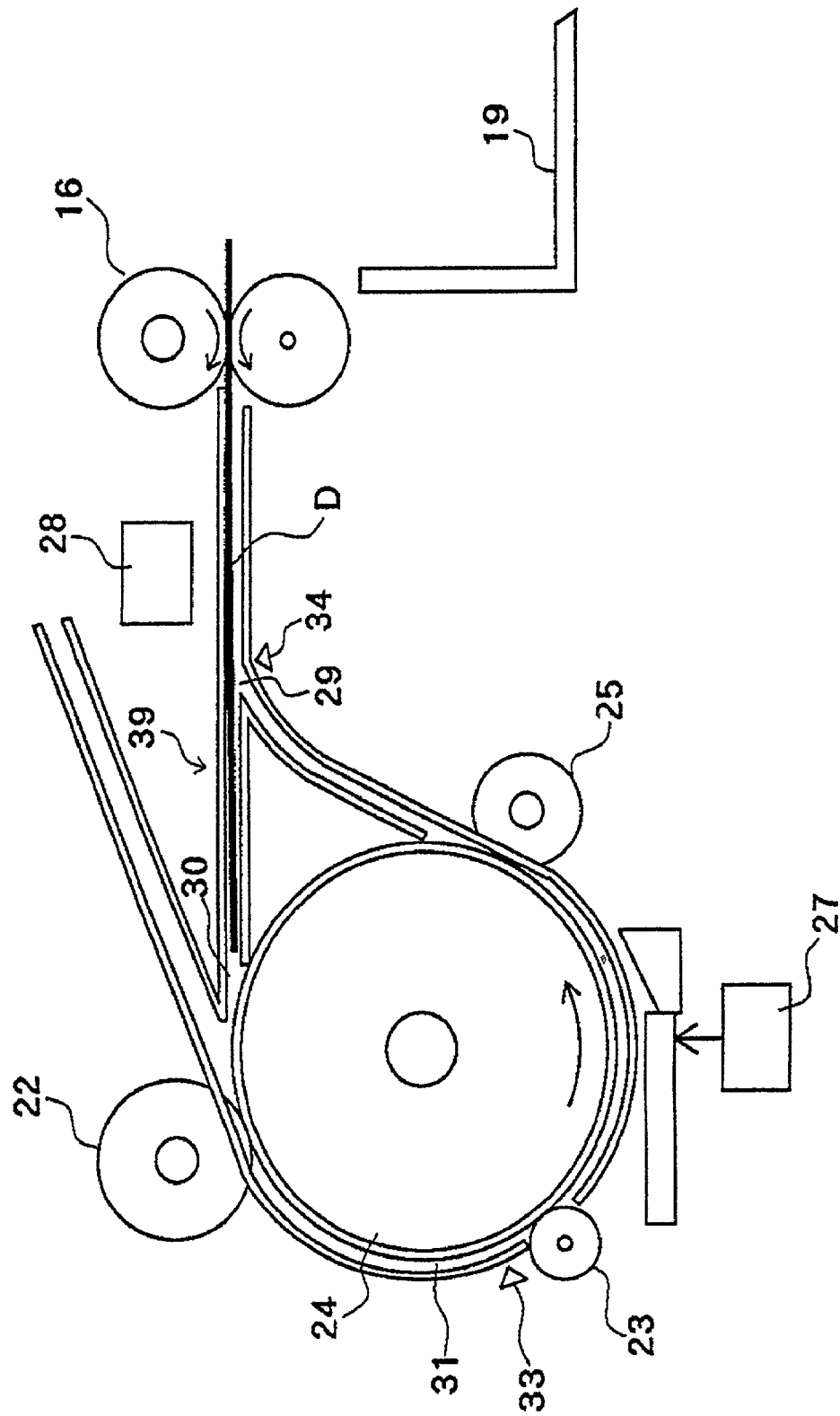
FIG. 6 is a view showing a state when an original document is guided to a reversal path according to the automatic original document feeding apparatus in FIG. 2.
Figure 7:
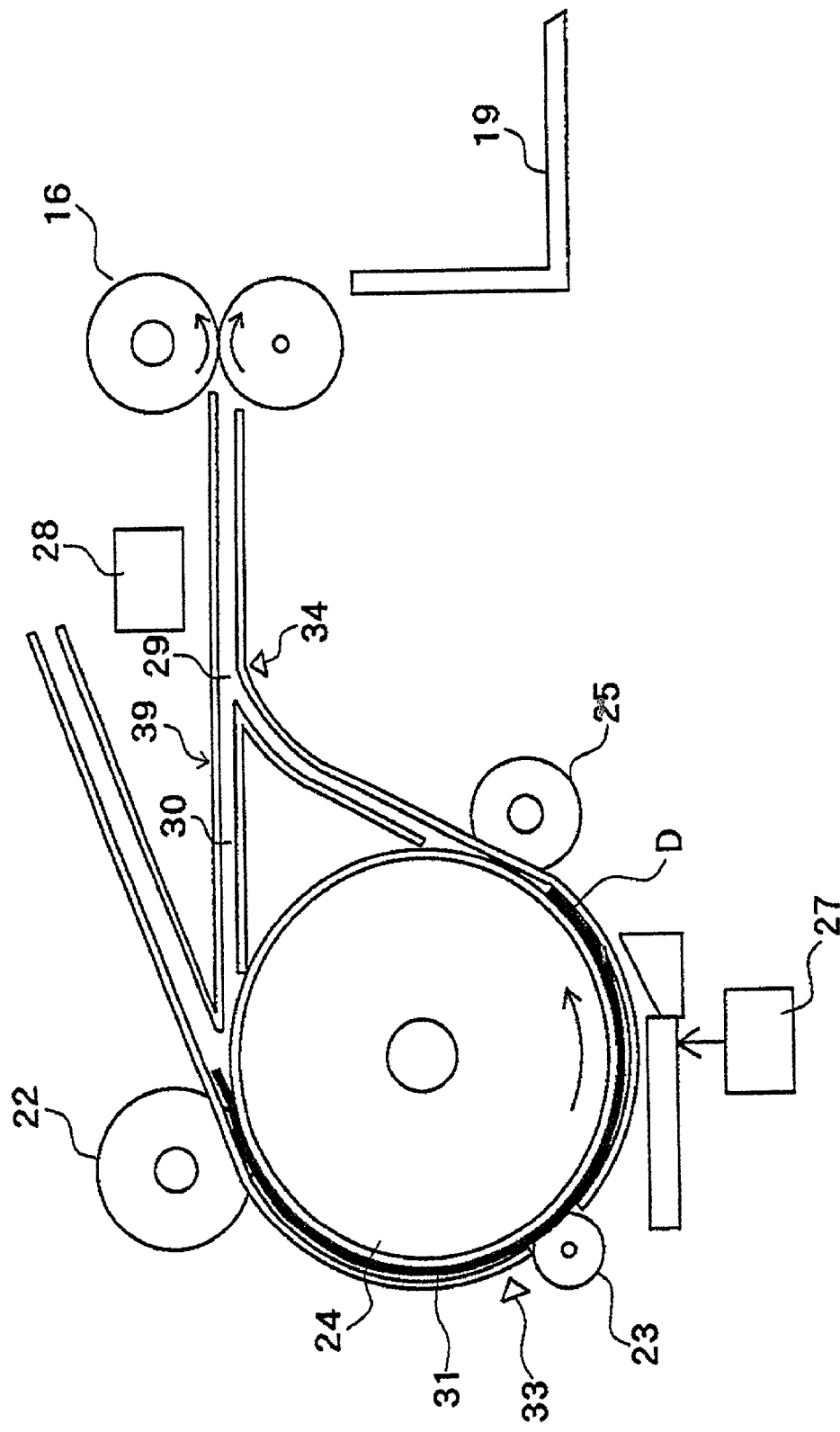
FIG. 7 is a view showing a state when a first contact sensor reads information recorded on the other side of an original document from the state in FIG. 6.

The original document D is then conveyed to the reversal path 30 and switchback-conveyed to the resist roller pair 22, 24 as shown in FIG. 6. The original document D is then skew corrected and is re-conveyed to the first contact sensor 27 as shown in FIG. 7. In this situation, the original document D is upside down due to the switchback conveyance. The first contact sensor 27 reads the image information recorded on the other side (back side, bottom side when placed on the original document feeding tray 11) of the original document.

In means to align the page order of the original document, the control section 32, after the second original document detecting sensor 34 detects the rear end of the original document, re-guides the original document to the reversal path 30, then switchback-conveys the original document, then turns the original document upside down once again, and then passes the original document through the first contact sensor 27. In this situation, the first contact sensor 27 does not read the original document. The original document delivery roller pair 16 finally delivers the original document onto the original document delivery tray 19 in an aligned page order.

(When the First Contact Sensor 27 is Disabled)

An original document mounted on the original document feeding tray 11, starting from an uppermost placed original document, is conveyed in-between a separation conveying roller 3 and a separation pad 4 by an original document feeding roller 1, and is then separated to a single sheet and conveyed by the separation conveying roller 3 and the separation pad 4.

The separated single original document is skew corrected by a resist roller pair 21 arranged downstream, is then passed through a roller pair 22, 24 and a roller pair 23, 24, and is then guided to a first contact sensor 27. The original document along the way passes through the first original document detecting sensor 33.

In this situation, when the first contact sensor 27 does not read the image on the original document even though the first original document detecting sensor 33 has detected the original document, the control section 32 determines that the first contact sensor 27 is in a disabled state and then continues to convey the original document.

The second contact sensor 28 reads image information recorded on one side (front side, upper side when placed on the original document feeding tray 11) of an original document D. Since the control section 32 had determined that the first contact sensor 28 is in a disabled state, the original document delivery roller pair 16 is reversed after the rear end of the original document is detected by the second original document detecting sensor 34, and thereby, the original document guided to the original document delivery roller pair 16 is reversely conveyed.

The original document D is then conveyed to the reversal path 30 and switchback-conveyed to the resist roller pair 22, 24. The original document D is then skew corrected, is re-conveyed to the first contact sensor 27, and is further conveyed to the second contact sensor 28. In this situation, since the original document D is upside down due to the switchback conveyance, the second contact sensor 28 reads the image information recorded on the other side (back side, bottom side when placed on the original document feeding tray 11) of the original document.

In means to match the page order of the original document, the control section 32, after the second original document detecting sensor 34 detects the rear end of the original document, re-guides the original document to the reversal path 30, then switchback-conveys the original document, then turns the original document upside down once again, and then passes the original document through the first contact sensor 27 and the second contact sensor 28. In this situation, the second contact sensor 28 does not read the original document. The original document delivery roller pair 16 finally delivers the original document onto the original document delivery tray 19 in a matched page order.

(When the First Contact Sensor 27 and the Second Contact Sensor are Disabled)

In a case where the first contact sensor 27 and the second contact sensor are disabled, the control section 32 determines that the first contact sensor 27 and the second contact sensor 28 are in a disabled state since neither the first contact sensor 27 nor the second contact sensor 28 read the image on the original document even though the first original document detecting sensor 33 and the second original document detecting sensor 34 have detected the original document.

Although the foregoing operation is explained by using an example where an image is formed on both sides of the original document, it is to be noted that the ADF 80 of this embodiment can read image information on a sheet by performing the same operation even when the image information is formed only on a single side of the original document mounted on the original document feeding tray 11 (when a single-side mode is selected) as long as one of the contact sensors is capable of reading the image information.

As described above, since the ADF 80 of this embodiment has the reversal path 30 arranged thereto, the ADF 80 of this embodiment can read image information formed on both sides of an original document by switchback-conveying the original document and reversing the front and back of the original document with use of the reversal path 30, and can also read image information formed only on a single side of an original document.

Although the first original document detecting sensor 33 and the second original document detecting sensor 34 are employed in the ADF 80 of this embodiment for detecting the position of an original document, it is to be noted that the conveyance of the original document can also be controlled by detecting the position of an original document based on the rotation count of each of the rollers.

(Second Embodiment of an Information Reading Apparatus)

Figure 11:
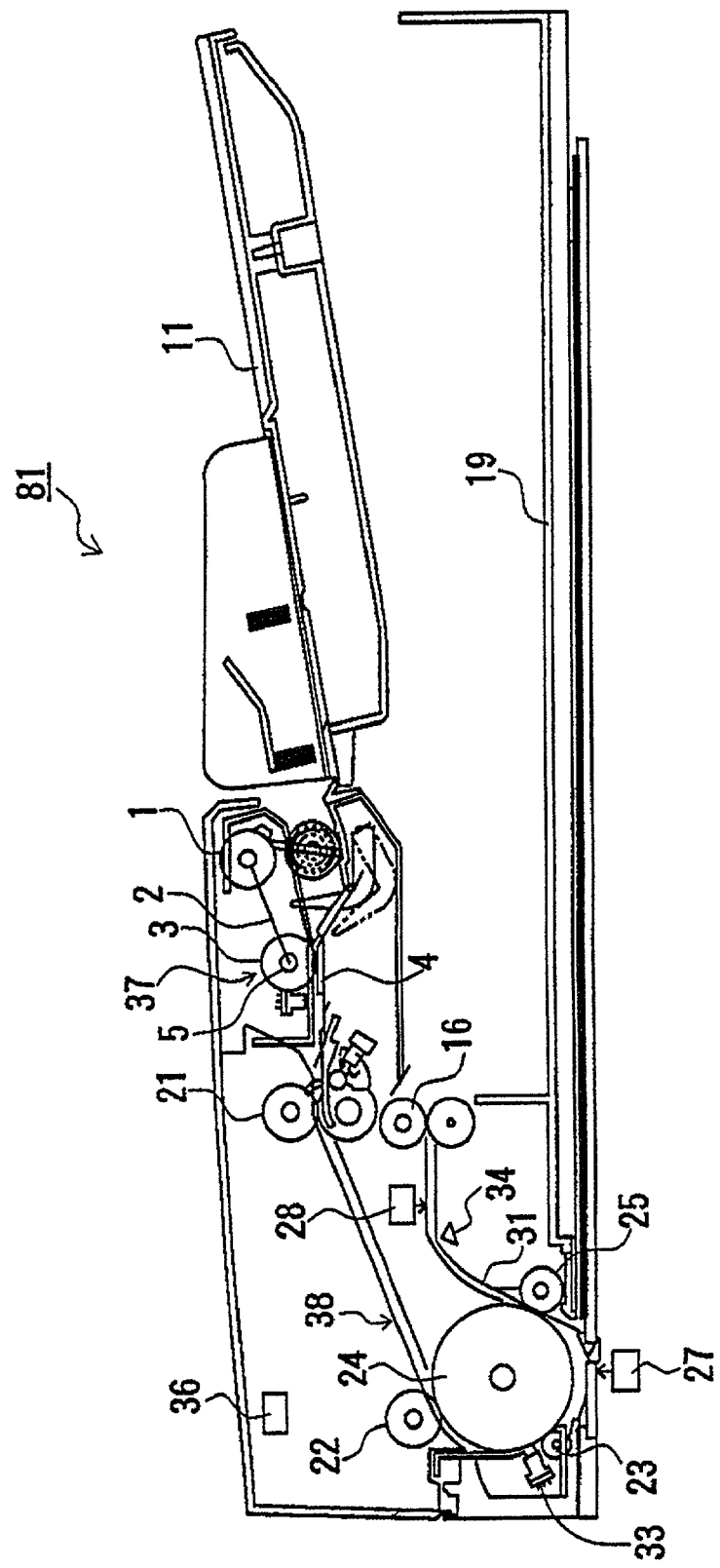
FIG. 11 is a schematic front cross-sectional view of an automatic original document feeding apparatus according to another embodiment of this invention regarding an information reading apparatus.
Figure 13:
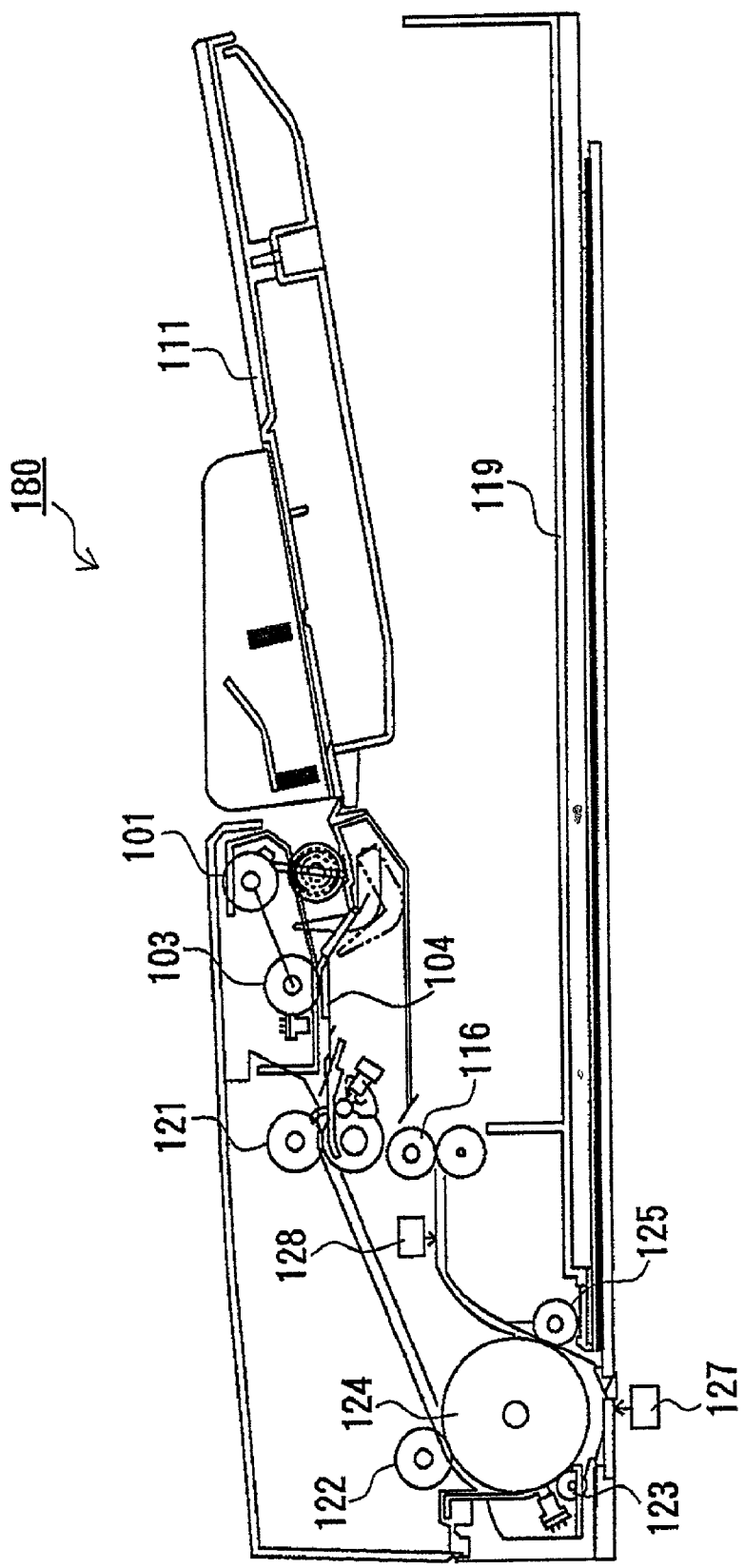
FIG. 13 is a schematic front cross-sectional view of a conventional automatic original document feeding apparatus.
Figure 14:
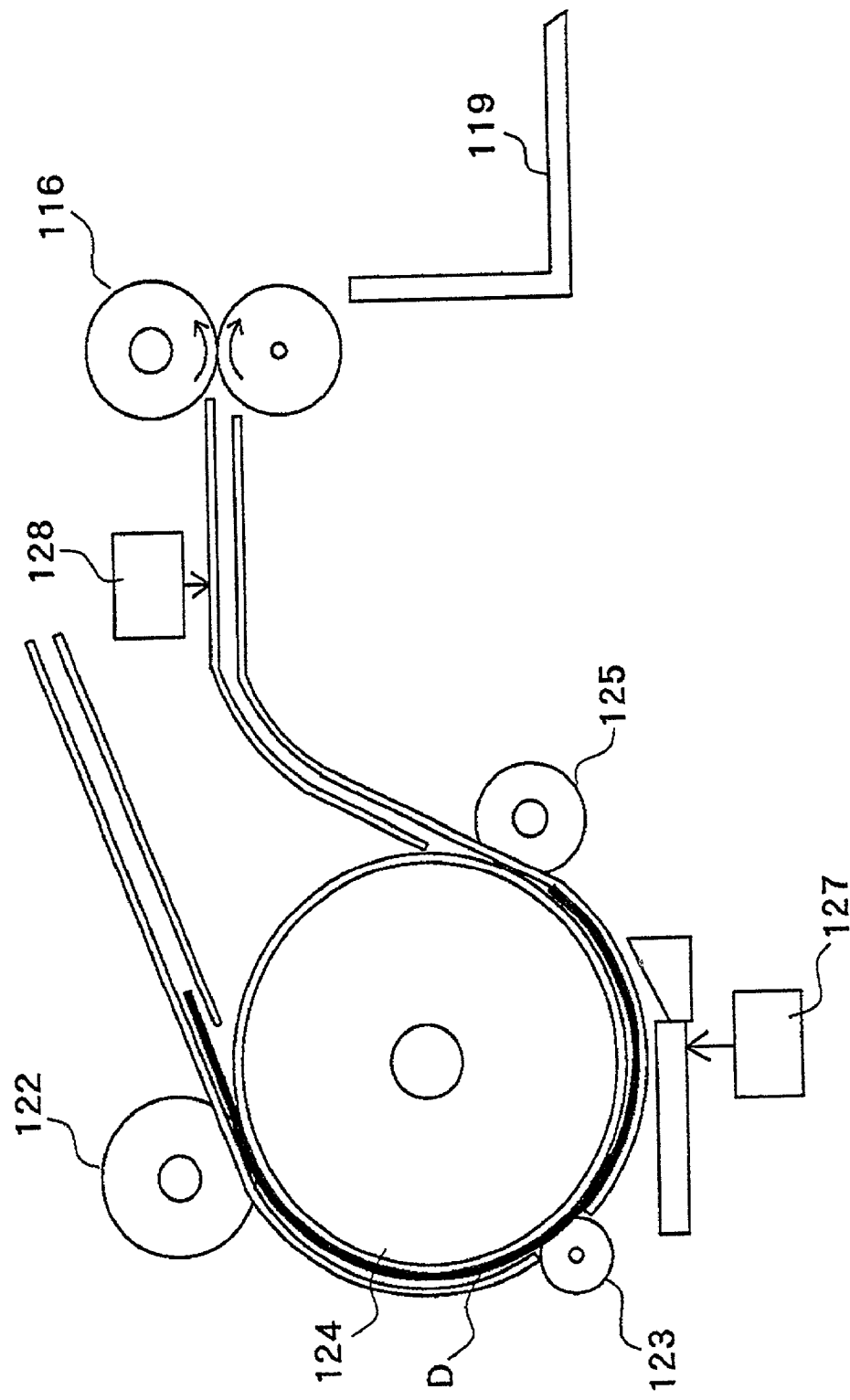
FIG. 14 is a view showing a state when a first contact sensor is reading an original document according to a conventional automatic original document feeding apparatus.
Figure 15:
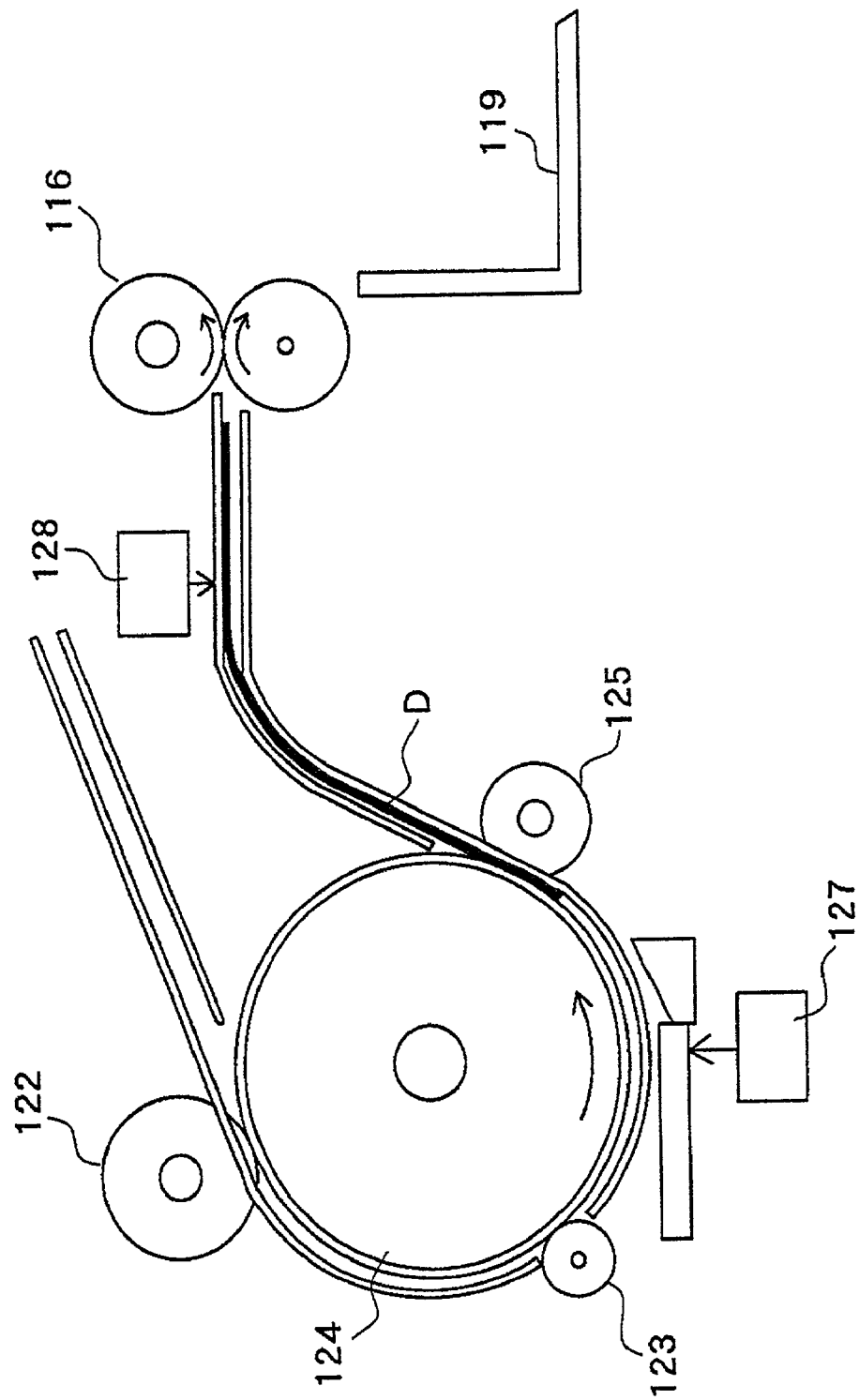
FIG. 15 is a view showing a state when a second contact sensor is reading an original document according to a conventional automatic original document feeding apparatus.
Figure 16:
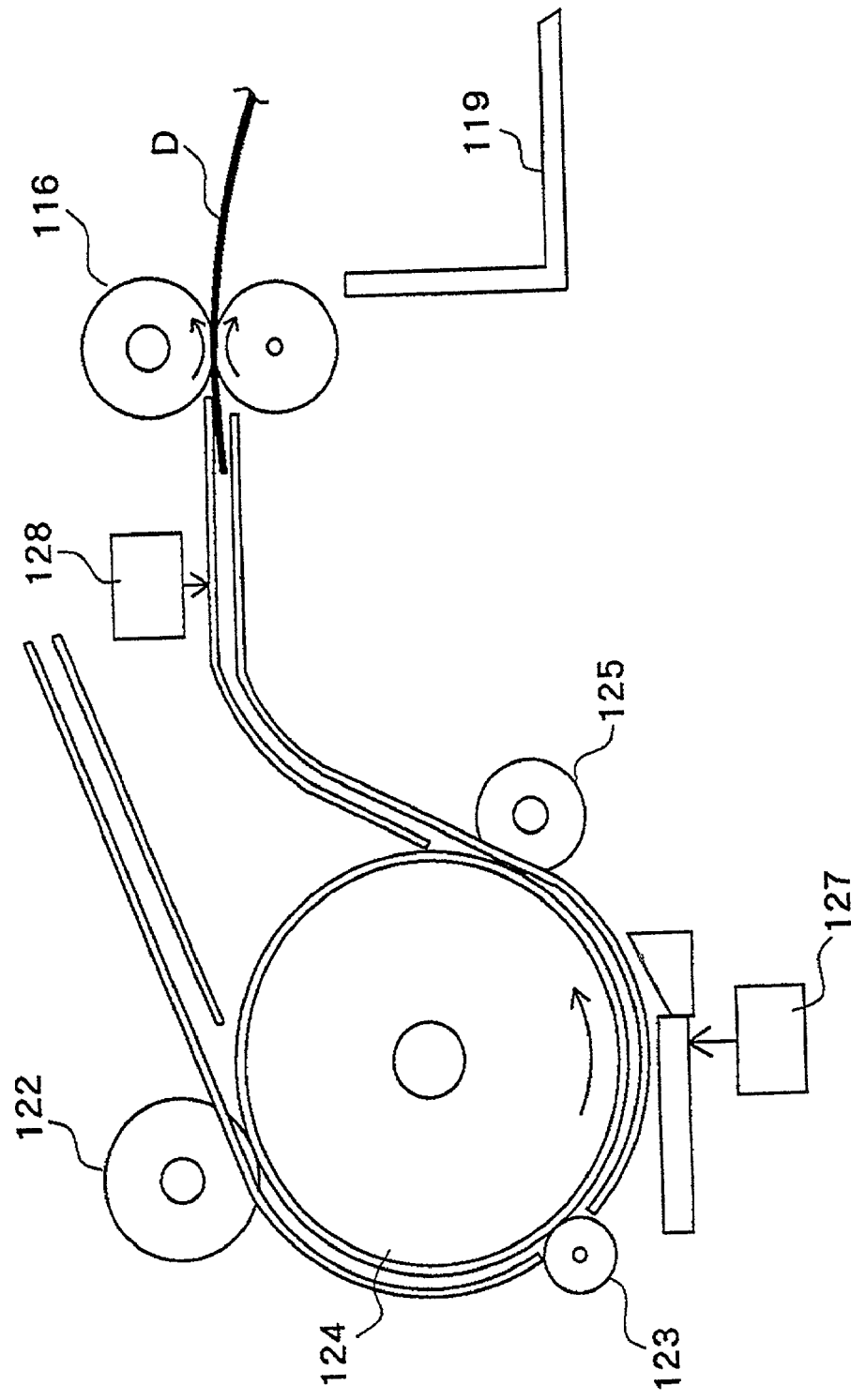
FIG. 16 is a view showing a state when an original document is being delivered upon an original document delivery tray according to a conventional automatic original document feeding apparatus.

An information reading apparatus of a second embodiment has an ADF different from that of the information reading apparatus of the first embodiment as shown in FIG. 11. An ADF 81 for the information reading apparatus of the second embodiment independently (separately) reads a front side and a back side of a sheet having images formed on both sides thereof to enable double-side reading even when one of the contact sensors 27 or 28 is disabled. It is now to be noted that the reversal path 30 in the ADF 80 of the first embodiment is not required for the ADF 81 of the second embodiment.

A user mounts an original document having an image formed on both sides thereof onto the original document feeding tray 11, in which the original document having a first page disposed in an uppermost position is mounted in sequential page order from first page (second page), third page (fourth page) to n−1 (n page) page as shown in FIG. 12(a). The original document has an odd number page thereof read by the first contact sensor 27 and is then conveyed to the second contact sensor 28; subsequently, a control section 36 determines that the second contact sensor 28 is unable to read and then indicates on a display panel on a main body of a copier that an even number page is unreadable when the second contact sensor 28 does not read the image on the original document even though the second original document detecting sensor 34 has detected the original document. The user presses a reading continuation key to continue reading.

The ADF 81 allows the first contact sensor 27 to sequentially read the odd number page until reaching the last original document as shown in FIG. 12(b), and then allows the original document to be delivered to the original document delivery tray 19. The original document having the first page disposed at a bottommost position is stacked on the original document delivery tray 19 in sequential page order. That is, the original document is stacked on the original document delivery tray 19 in a manner where the last even number page is disposed at an uppermost position thereof. The user mounts such original document bundle, which is kept intact with the last even number page disposed at an uppermost position thereof, onto the original document delivery tray 19 and then presses an image reading key once again, and thereby the first contact sensor 27 reads the original document from the last even number page (n) in a sequential order as shown in FIG. 12(c).

The read information of the original document is kept in memory by the control section 36 until the reading of the entire original document is completed, and is transmitted from the control section 36 to the main body of the copier after the reading of the entire original document is completed.

It is now to be noted that the ADF 81 allows the second contact sensor 28 to first read the even number page when the first contact sensor 27 is disabled.

Accordingly, the ADF 81 of the second embodiment, which has a first reading mode for reading only a front side and a second reading mode for reading only a backside, reads the front side and the back side separately and then aligns the page order of the image information, so that the ADF 81 of the second embodiment having no particular reversal path formed thereto can desirably read the front side and the back side.

The ADF 81 of the second embodiment can perform reading operation faster than the ADF 80 of the first embodiment since the ADF 81 of the second embodiment does not require performing the switchback conveyance of a sheet.

The copier 90 can reliably form an image on a sheet since the ADF 80, 81 being capable of reading both sides of an original document is attached to the main body of the copier 90.

An information reading apparatus of this invention can read both sides of an information sheet even when one of a first information reading means and a second information reading means is disabled by use of the remaining other information reading means.

An information reading apparatus of this invention having a reversal path for reversing a front side and back side of an information sheet can read both sides of the information sheet even when one of the first information reading means and the second information reading means is disabled by use of the other information reading means. It is now to be noted that the information sheet is passed again to a backward conveyance means after the other information reading means performs a reading procedure for a second time instead of the other information reading means performing a reading procedure for a third time, so that the order of the pages of the delivered information sheets can be aligned.

An information reading apparatus of this invention, which has a first reading mode for reading one side of an information sheet and a second reading mode for reading the other side of the information sheet, reads the front side and the back side separately and then performs a process of aligning the page order of the image information, so that the information reading apparatus of this invention having no particular reversal path can read both sides of the information sheet even when one of a first information reading means and a second information reading means is disabled.

An information reading apparatus of this invention first reads one side of an information sheet, then delivers the information sheets stacked on an information stacking means to a delivery tray in a front-back reversed state, and then reads the other side of the information sheet when an operator places the information sheets maintaining the front-back reversed state again on the information stacking means.

What is claimed is:

1. An information reading apparatus comprising:
information sheet stacking means for stacking an information sheet having information recorded thereon;
first information reading means for reading information recorded on one side of the information sheet fed from the information sheet stacking means;
second information reading means for reading information recorded on the other side of the information sheet;
information sheet conveying means for conveying the information sheet from the information sheet stacking means to the second information reading means via the first information reading means; and
control means able to control a first reading step for reading one side of the information sheet with one of the first information reading means and the second information reading means and a second reading step for reading the other side of the information sheet with the one of the first information reading means and the second information reading means when the other one of the first information reading means and the second information reading means is unable to read information, and being able to store in memory information read from the first reading step and the second reading step in a sequential page order of the information sheet.

2. The information reading apparatus according to claim 1,
wherein at least one of the first and second information reading means has an information sheet delivery tray, and
wherein the information sheet delivery tray is arranged proximal to the information sheet stacking means and delivers an information sheet to the information sheet delivery tray in a front-back reversed state relative to a state when being stacked on the information sheet stacking means.

* * * * *